United States Patent
Engel

[15] 3,685,937

[45] Aug. 22, 1972

[54] INJECTION MOULDING APPARATUS WITH DYNAMIC IMPACT INJECTION ASSIST MEANS AND CONTROL THEREFOR

[72] Inventor: Thomas Paul Engel, 6056 Heusenstamm, Offenbach M., Germany

[22] Filed: Feb. 25, 1970

[21] Appl. No.: 14,012

[30] Foreign Application Priority Data

March 5, 1969 Great Britain..........11,732/69
Dec. 10, 1969 Great Britain..........60,290/69

[52] U.S. Cl. ................425/167, 425/244, 425/242, 264/328
[51] Int. Cl. .............................................B29f 1/06
[58] Field of Search...18/30 AH, 30 AM, 30 QB, 30 PA,
18/30 JA, 30 FM, 30 NA, 30 QM, DIG. 28, DIG. 1, 30 QD, 30 CM, 30 CK

[56] References Cited

UNITED STATES PATENTS 3,239,881  3/1966  Larsen.....................18/12 TT
2,592,296  4/1952  Kutik......................18/30 NA
3,482,285  12/1969 Falkenberg.............18/30 NY
3,396,431  8/1968  Kovach et al..........425/166 X

FOREIGN PATENTS OR APPLICATIONS 551,468  2/1943  Great Britain..........18/30 AH

*Primary Examiner*—J. Spencer Overholser
*Assistant Examiner*—David S. Safran
*Attorney*—Ostrolenk, Faber, Gerb & Soffen

[57] ABSTRACT

The disclosure relates to the shaping of materials typically plastics materials which comprises introducing the material into a compression chamber, heating the material within the chamber to a moulding or extrusion temperature, injecting material from said chamber into a mould or through a die and imparting at least during said injection a plurality of dynamic impacts to the material within the compression chamber. The material may be shaped by injection into a mould and the injection may be effected by moving the mould relative to the body of the material within the compression chamber the plurality of dynamic impacts serving to assist in the filling of the mould by the material.

4 Claims, 3 Drawing Figures

INVENTOR
THOMAS PAUL ENGEL
BY OSTROLENK, FABER, GERB & SOFFEN
ATTORNEYS

INJECTION MOULDING APPARATUS WITH DYNAMIC IMPACT INJECTION ASSIST MEANS AND CONTROL THEREFOR

The present invention relates to a method and apparatus for the injection or shaping of materials, typically by extrusion or by blow moulding.

At the present time, considerable effort has been devoted to the manufacture of injection moulding and like apparatus and the present method of operation of this type of apparatus is to provide a screw feed for introducing particulate material to a heating chamber and thereafter to drive heated material from said chamber by one stroke of a ram to drive the material from the heated chamber into a mould. The heated material, which is typically a thermoplastic material such, for example, as polyethylene or polyvinyl chloride, is in its molten state and is viscous and exerts a considerable viscous drag on the walls of the compression chamber during the act of driving the material from the compression chamber into the mould. This viscous drag results in a reduction of the effective force applied by the ram, with the effect that the force acting on the material filling the extremities of the mould is considerably less than the force applied by the said ram.

According to the present invention, there is provided a method of shaping a material which method comprises introducing said material into a compression chamber, heating the material within said chamber to a moulding or extrusion temperature, injecting material from said chamber into a mould or through a die, and imparting, at least during injection of said material, a plurality of dynamic impacts to the material within said compression chamber.

The material may be shaped by injection into a mould and the injection may be effected by moving the mould relative to the body of material within said compression chamber, the plurality of dynamic impacts serving to assist in the filling of the mould.

The advantage of the process of the invention is that the bulk of the material within the pressure chamber remains stationary and does not move relative to the walls of the chamber itself. In this way, the viscous drag of the material moving relative to the fixed walls of the pressure chamber is substantially reduced and consequently, the compression force is applied direct to the material in and adjacent the mould, and the moulding forces within the mould itself are, in consequence, very much greater.

Furthermore, by the provision of the plurality of impulses applied to the molten material during the course of the moulding operation additional assistance is given to the filling of the extremities of the mould by the molten material.

The present invention also includes moulding apparatus comprising a compression chamber, means for introducing material to be shaped into said compression chamber, means for injecting said material within said compression chamber into a mould or through a die, and means for imparting during injection a plurality of dynamic impacts to the material within said compression chamber.

One embodiment of the apparatus of the present invention is for injection moulding and includes means for injecting the material to be shaped into a mould comprising means for varying the volume of said compression chamber between predetermined limits and means for moving said mould relative to the body of material within said compression chamber to reduce the volume of said compression chamber and wherein said dynamic impacts assist in filling of the mould during injection.

The pressure chamber may be a two component pressure chamber, one of which components is slidable within the other in the manner of a telescope. Alternatively, a plurality of components may be employed. In one aspect of the present invention, the reciprocating motion of the piston or ram is transverse or perpendicular to the direction of mould movement during the application of pressure to the material within the pressure chamber.

Following is a description by way of example only and with reference to the accompanying drawings, of the method and apparatus in accordance with the present invention.

Figure 1:
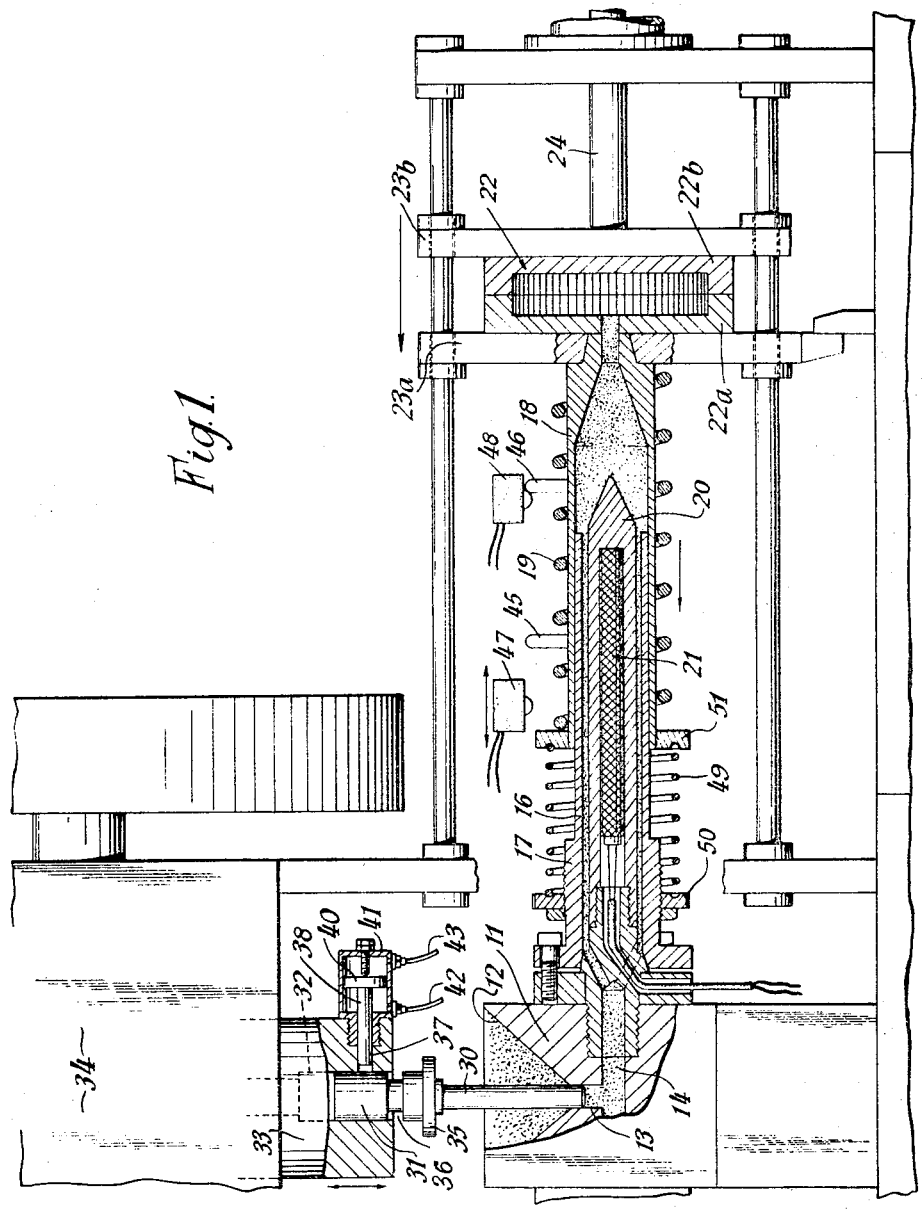
FIG. 1 is a view partly in section of apparatus in accordance with the present invention.
Figure 2:
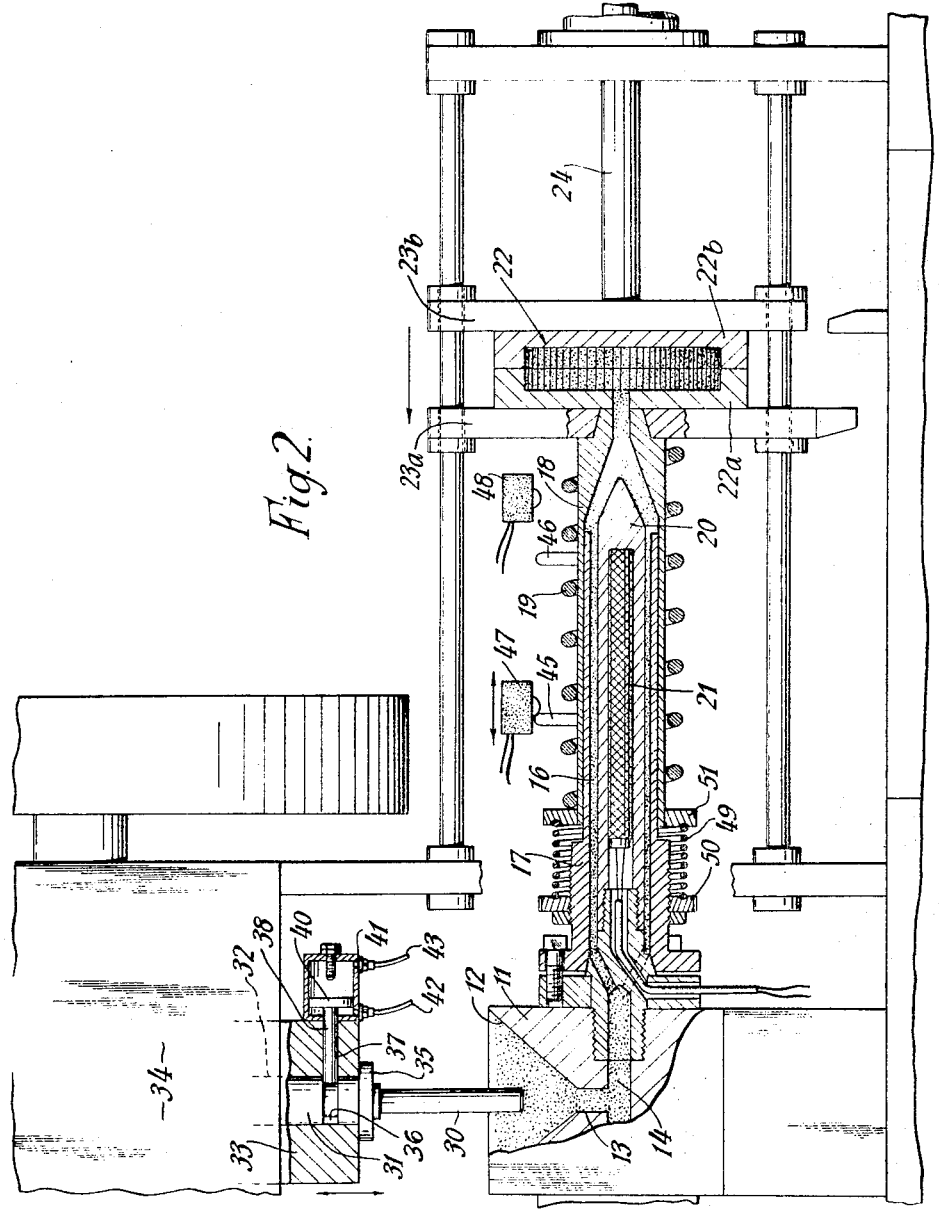
FIG. 2 is another view of the apparatus of FIG. 1 in which the mould is in the filled position.

The apparatus comprises a block 11 having a hopper portion 12 for the introduction into the apparatus of material to be moulded, the walls of the hopper converging downwardly to debouche into a cylinder 13 communicating with a horizontal preliminary chamber 14. The preliminary chamber 14 debouches at its rearward end into a compression chamber 16 defined by a first telescope element 17 mounted to block 11, and a movable second telescope element 18. One of the first 16 or the second 18 telescope elements is rotatable with respect to the other to effect a mixing action on the material within compression chamber 16. The movable telescope element 18 is surrounded by heating elements 19 which serve to heat material within compression chamber 16. The bulk of compression chamber 16 is occupied by a torpedo like element 20 also containing a heating element 21 which serves to assist in heating of the material within the compression chamber 16.

The movable telescope 18 communicates at its rearward end with a mould 22 formed of first and second mould parts 22a and 22b respectively, each of which parts are carried in a cross head assembly 23a and 23b, the rearward element of which 23b is connected to the actuating rod 24 of an hydraulic ram (not shown) capable of imparting moulding pressure to a second mould part 22b to effect clamping of mould part 22b to mould part 22a and a urge the clamped moulded assembly 22 together with the second movable telescope element 18 forwardly of the apparatus towards block 11, thereby effecting a reduction in the volume of the compression chamber 16.

The means for introducing the material into preliminary chamber 14 comprises a piston member 30 adapted for reciprocating movement into and out of cylinder 13.

Figure 3:
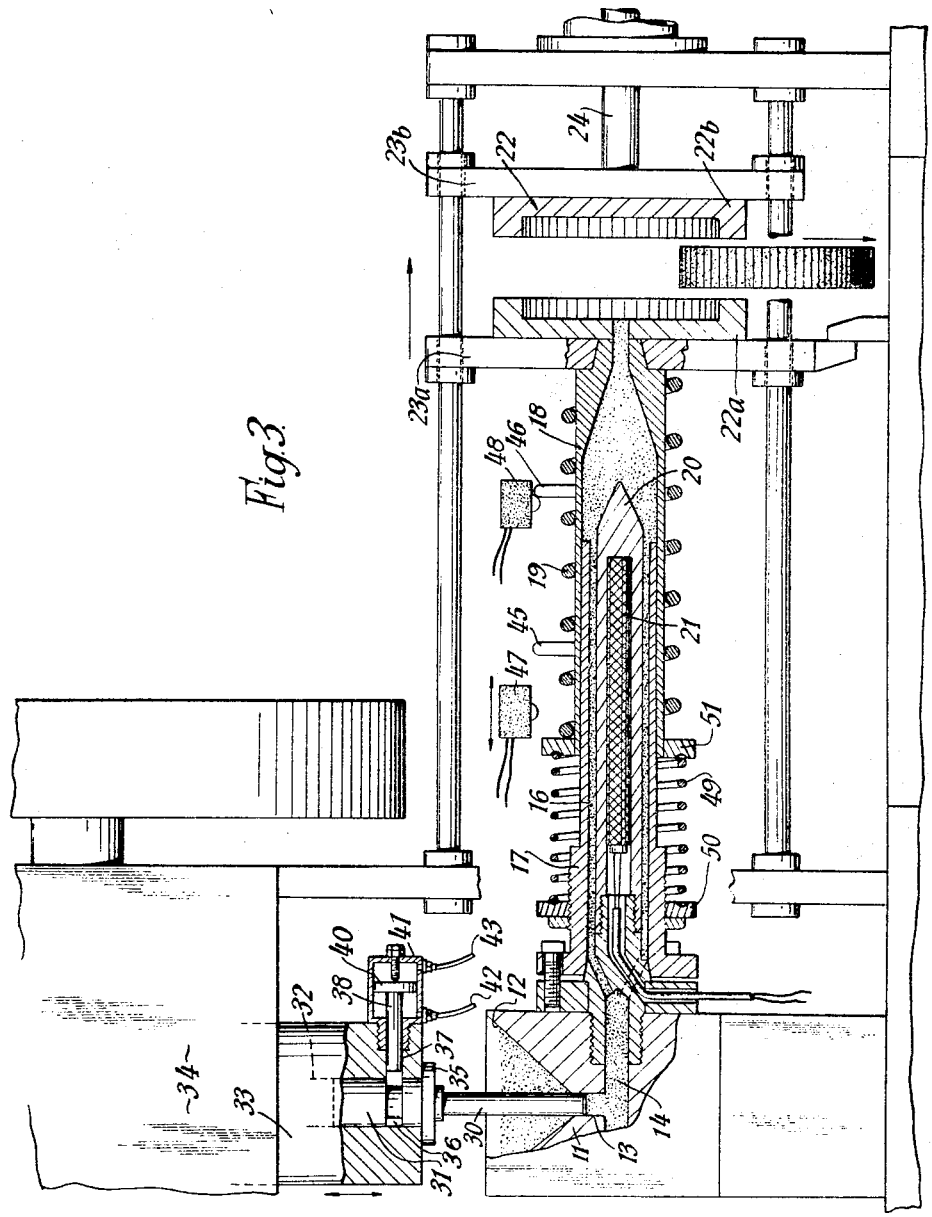
FIG. 3 is a further view of the apparatus of FIG. 1 showing the mould in the released position and the moulded article being ejected therefrom.

The upper end of the member 30 comprises a thickened portion 31 which is adapted to be accommodated within a bore 32 in a connecting rod 33, the connecting rod 33 forming the reciprocating portion of an excenter press indicated generally at 34. At the junction of the thickened portion 31 with piston 30 there is provided an annular flange 35 which limits the extent of the accommodation of thickened portion 31 within connecting rod 33. Thickened portion 31 is provided with an annular groove 36 which, with the thickened portion 31 entered into bore 32 to its fullest extent as shown in FIG. 3, is adapted to cooperate with a transverse cylinder 37. The cylinder 37 accommodates an engaging member 38 movable between a first connecting position in which an end member 38 engages with groove 36 to couple piston 30 for movement with connecting rod 33 and a free position in which the connecting rod 33 is capable of reciprocating motion with respect to piston 30.

Engaging member 38 is provided at a rearward end with piston 40 moving within pneumatic cylinder 41 provided with air inlets 42 and 43 respectively.

Second telescope element 18 is provided with a pair of upstanding abutments 45 and 46, each of which is adapted to engage with microswitches 47 and 48 respectively. A spring 49 is disposed between an adjustable abutment 50 carried about first telescope element 17 and a flange 51 at the forward end of movable telescope element 18.

The cycle of operations of the apparatus described above is that material is introduced into the hopper 12 in block 11 and preliminary chamber 14 and compression chamber 16 are initially filled with the material to be moulded. With the engaging member 38 disengaged from the recess 36, piston 30 is substantially stationary within cylinder 13 and the connecting rod 33 reciprocates relative to piston 30 and strikes flange 35 of piston 30 at or towards the lower end of each reciprocation to impart a shock to material contained within said chambers 14 and 16.

At the commencement of the moulding action, the first and second mould parts 22a and 22b respectively are clamped together by the application of force from the hydraulic ram via ram rod 24 and the continued application of force urges the mould assembly 22 together with the second telescope element 18 forwardly of the apparatus to telescope over the external surface of the first telescope element 17 thereby exerting moulding pressure within compression chamber 16. Material to be moulded passes into mould 22 while at the same time an impulse is imparted to the material in chambers 14 and 16 to assist in filling of the mould. Continued application of pressure to mould 22 causes continued forward movement of the mould, spring 49 serving to increase progressively the resistance to movement of telescope element 18 to prevent splitting of the mould due to increasing fluid pressure exerted therein by the moulded material. Continued forward movement of the telescope element 18 continues until abutment 45 engages with microswitch 47. Whereupon an air valve (not shown) is opened to provide air under pressure to conduit 43 to the rearward side of piston 40 to urge piston 40 and engaging member 38 forwardly to the engaging position with annular groove 36 in piston 30, thereby coupling piston 30 for movement with the connecting rod 33 by excenter press 34. Reciprocation of piston 30 results in the introduction of material in hopper 12 into preliminary chamber 14. At the same time, moulding pressure applied to rod 24 is released to a level sufficient to maintain the clamping of the mould alone and continued reciprocation of piston 30 drives further material into preliminary chamber 14 and thence into compression chamber 16 to expand compression chamber 16 and move second telescope element 18 rearwardly of the apparatus until abutment 46 engages with microswitch 48. When microswitch 48 is triggered, a second air valve (not shown) is opened to admit air under pressure to conduit 42, thereby urging piston 40 and engagement member 38 out of engagement with groove 36 and piston 30 to permit connecting rod 33 to reciprocate with respect to piston 30 after a predetermined amount of mouldable material has been introduced into compression chamber 16.

During this period the material within the mould 22 has solidified and/or cured. On return of the second telescope element 18 to its initial or datum position, the ram rod 24 is withdrawn rearwardly of the apparatus to separated mould parts 22a and 22b as shown in FIG. 3 to discharge the moulded material downwardly into a suitable receptacle and thereafter the mould clamping ram acting through rod 24 urges second mould part 22b into clamping relationship with mould part 22a and the moulding cycle described above is then repeated.

It will be appreciated that the quantity of material to be introduced into the mould 22 can be adjusted by adjusting the throw of telescope element 18. For this purpose, microswitch 47 and abutment 50 are each adjustable in position, thereby permitting the throw of telescope element 18 and hence the volume of material introduced into the mould to be carefully controlled.

The valve may be incorporated between the preliminary chamber 14 and the compression chamber 16 to prevent backflow of polymer from the compression chamber to the preliminary chamber and thence to piston 30 during the moulding operation.

It will also be appreciated that apparatus of the present invention is suitable for blow moulding and the apparatus can be employed with any high molecular weight thermoplastic polymer typically polyethylene, styrene and polyvinyl chloride.

The viscous drag of the material moving within the first telescope portion is completely eliminated; the only viscous drag results from the movement of the second telescope portion forwardly of the apparatus with respect to the material to be moulded which remains substantially stationary except over that part of the apparatus leading to the mould and, of course, the movement of the material with respect to and into the mould itself.

The following examples were carried out using the apparatus described above.

EXAMPLE 1

Granules of polyethylene available under the trade name "HOSTALEN GUR" and having a molecular weight of about 1 million was introduced into the hopper 12. The polymer was introduced into the hopper in the form of hot particles of small size. The material was initially compressed and heated to a temperature of 150° C. in the preliminary chamber 14. The material passed to the pressure chamber 16 and was there heated to a temperature of 250° C. The temperature of the mould remained at an average of 40° C., the mould being of a 130 millimeter diameter gear having a weight of about 200 grams. The cycle time for the moulding operation was 3 minutes and on release of the mould, a gear wheel was obtained having an excellent shape free of occlusions and deformities.

EXAMPLE 2

Example 1 was repeated using polyethylene commercially available under the Trade Mark "LUPOLEN 5261 Z." This grade of polyethylene has a molecular weight of about 300,000. The polymer was introduced into hopper 12 in an irregular stream of lumps and rod. The temperature within the preliminary chamber was 150° C. and the temperature within the pressure chamber was 225° C. The mould temperature was 4° C. and cycle time was some 2 minutes. The same gear wheel was produced again with perfect form, no occlusions or deformities.

EXAMPLE 3

Example 1 was repeated using polypropylene commercially available under the Trade Mark "NOVOLEN BASF 1300." The polymer was introduced into the hopper 12 in a cold oven stream of finely divided particles. The temperature of the preliminary chamber was 150° C., the temperature of the pressure chamber was 250° C. and the mould temperature was 40° C.

In this case, the gear wheel of Example 1 was produced with a cycle time of 2 minutes and the resulting gear wheel was found to have excellent form with no voids, occlusions or deformities.

I claim:

1. An injection molding apparatus, comprising:
   a. a compression chamber defined by a pair of telescopable elements, the second of which is slidable relative to the first for reducing the volume of the chamber defined therebetween;
   b. a mold communicating with the compression chamber and being fed with material to be shaped therefrom;
   c. a pressure driven member supporting the mold and engaging the second telescopable element for urging said element toward the first telescopable element and thereby reducing the volume of the compression chamber and injecting material contained therein into the mold to effect an injection molding operation;
   d. a preliminary chamber communicating at its outlet end with the compression chamber and through which material to be molded is fed into the compression chamber;
   e. reciprocable piston means communicating with the inlet end of the preliminary chamber for imparting a plurality of dynamic impacts to material introduced into the preliminary chamber and forcing such material in pulse-like flow through such chamber and into the compression chamber;
   f. means for reciprocating the piston means responsive to a predetermined movement of the pressure driven member and second telescopable element toward the first telescopable element for imparting successive dynamic impacts to the material to be molded upon predetermined reduction of the volume of the compression chamber; and
   g. means for terminating reciprocation of the piston means responsive to a predetermined movement of the pressure driven member and second telescopable element away from the first telescopable element away for terminating the successive dynamic impacts on the material to be molded upon predetermined expansion of the volume of the compression chamber and termination of the injection molding step.

2. The apparatus of claim 1, in which the piston means (e), reciprocating means (f), and terminating means (g) comprise:
   i. a piston adapted to reciprocate within a cylinder communicating with said preliminary chamber to introduce material into the preliminary chamber and thence into said compression chamber;
   ii. drive means for the piston to impart reciprocating motion thereto; and
   iii. means for disengaging and for engaging the drive means from the piston to respectively discontinue the introduction of material into the preliminary chamber when disengaged and to maintain pressure within the preliminary chamber and in the compression chamber and to impart a plurality of dynamic impacts therein at least during the injection of material from the compression chamber into the mold when engaged.

3. apparatus as claimed in claim 2, further including first and second switch means connected with said mould so as to be actuated by movement of said mould, respectively, to a first and a second position, said first switch being connected with said disengaging and engaging means so as to cause said piston to reciprocate when said first switch is activated; said second switch being connected with said disengaging and engaging means so as to eliminate reciprocation of said piston when said second switch is activated, whereby the position of said mould with respect to said compression chamber determines when said piston reciprocates.

4. Apparatus as claimed in claim 2, wherein dynamic impact is provided by a continuously operating impact applying instrument and said reciprocating piston is connected with said impact applying instrument by means of an interconnection device, which interconnects said piston and said impact applying device when said first switch is activated, and disconnects said piston and said impact applying device when said second switch is activated.

* * * * *